July 3, 1956 — E. S. TUPPER — 2,752,971
FOOD SHAKER
Filed Dec. 24, 1952 — 2 Sheets-Sheet 1
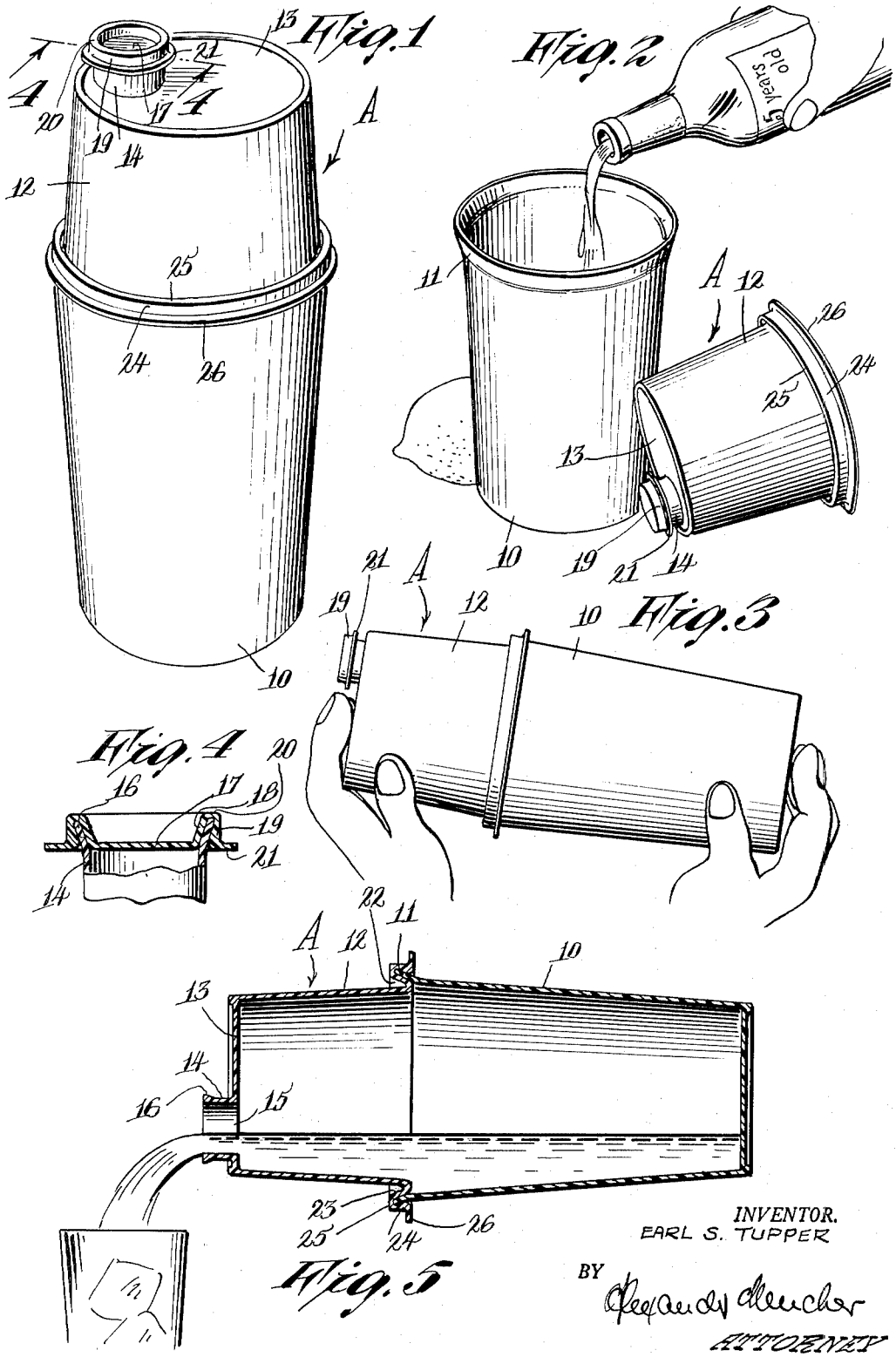
INVENTOR.
EARL S. TUPPER
BY
ATTORNEY July 3, 1956  E. S. TUPPER  2,752,971
FOOD SHAKER
Filed Dec. 24, 1952  2 Sheets-Sheet 2
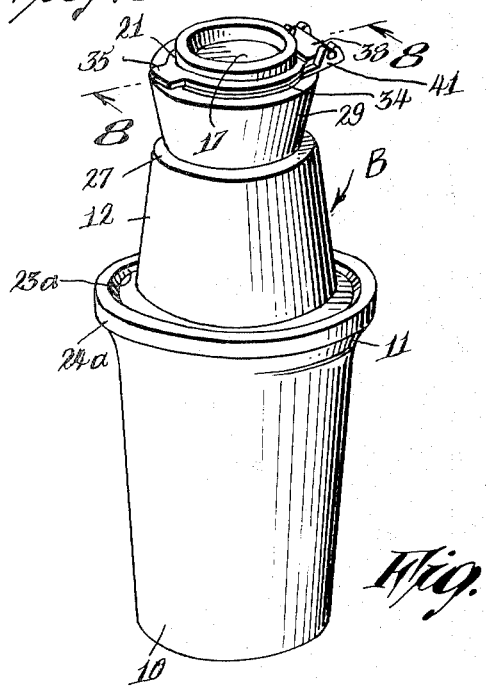
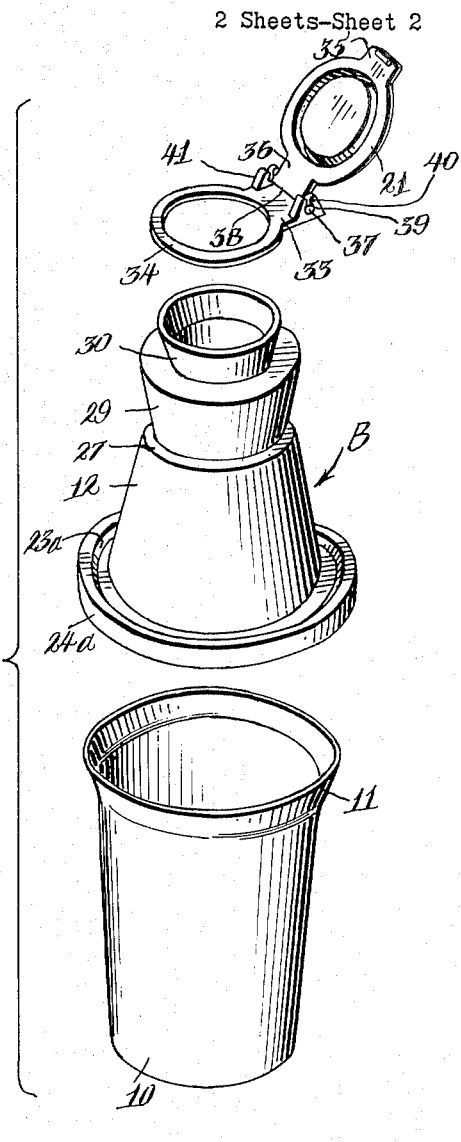
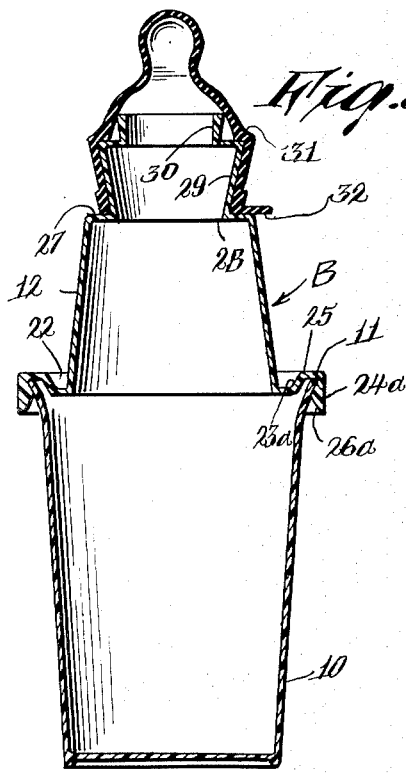
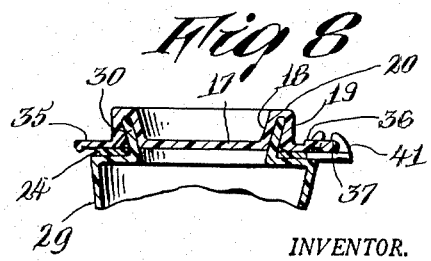
INVENTOR.
EARL S. TUPPER
ATTORNEY

United States Patent Office 2,752,971
Patented July 3, 1956

2,752,971
FOOD SHAKER
Earl S. Tupper, Upton, Mass.

Application December 24, 1952, Serial No. 327,744

3 Claims. (Cl. 150—0.5)

This invention relates generally to household receptacles, but more specifically to an assembly the parts and the whole thereof being capable of serving many functions including use as a dispenser, a drinking cup, a baby bottle, a canister, a fluid receiver, a food package, a tumbler and the like.

The assembly in parts utilizes the structure described and claimed in United States Patent Number 2,487,400, granted to the applicant herein on November 8, 1949.

Essentially, the assembly comprises a closure member of polyethylene or other plastic having similar physical properties and a receiving container member. The closure member has an elevated central wall portion to increase the capacity thereof and a peripherally grooved edge to engage the rim of the container member in a seal-tight relationship. The container member, furthermore, is preferably, but not exclusively also made of polyethylene or other plastic having similar physical properties.

Accordingly, the main object of the invention resides in the provision of structure for many selective uses as a beverage shaker and dispenser, a dispensing device, a drinking cup, a tumbler, a baby bottle, a canister, a food holder, a food or fluid package and the like.

A further object of the invention resides in the provision of a device of the above nature wherein the capacity of the container member is increased when the closure is applied thereto in seal tight relationship for storage, packaging, canister and dispensing purposes, the said closure member being provided with an opening in the top wall and an associated seal therefor.

The structure described, and as a further feature of the invention herein, is capable, by reason of resiliency and local distortability of the material, of being under a partial vacuum when in closed position thereby enabling increased sealing engagement between the closure and container members and between the closure member top wall opening and seal therefor.

A further object of the invention resides in the utilization in conjunction with specified structure of a material such as polyethylene or similar material having characteristics comprising a rubber like thermoplastic composition which does not absorb and is not readily wetted by water; is odorless, resistant to acids, alcohols, solvents and other chemicals at ordinary temperatures; will not soften far below the boiling point of water, is unbreakable, has flexibility and elasticity with a slow rate of recovery, is frictional and waxy to the touch.

A further object of the invention in conjunction with specified structure resides in use of a material which is light in weight, uniform, unaffected by working temperatures and which affords a sterile medium for and consequently is resistant to mildews, micro-organisms and insects.

Another feature of the invention resides in the provision of a device which may be molded by compression or injection in all its parts and which is economical to manufacture, durable, easy to clean and efficient in operation.

Other incidental features of the invention will hereinafter appear in the progress of the disclosure and as pointed out in the appended claims.

Accompanying this specification are drawings showing several forms of the invention wherein:

Figure 1 is a view in perspective of the device in assembled condition showing a spout and seal therefor forming part of the closure member, the latter being applied to the container member.

Figure 2 is a view in perspective of the device of Figure 1 showing the closure member removed from the container member serving as a tumbler for filling purposes.

Figure 3 is a view in perspective of the device in assembled condition and shows use as a beverage shaker.

Figure 4 is a partial and enlarged sectional view of Figure 1 across the plane 4—4 thereof.

Figure 5 is a sectional view substantially along the axis of the assembled device shown in Figure 3 with the closure member seal removed and shows the device used as a beverage shaker dispenser.

Figure 6 is a view in perspective of a modified form of the assembled device also showing a hinge type of closure member seal.

Figure 7 is an exploded view in perspective of the device shown in Figure 6 with all the parts in disassembled position.

Figure 8 is a partial and enlarged sectional view of Figure 6 across the plane 8—8 thereof.

Figure 9 is a longitudinal sectional view of the assembled device showing the closure member opening engaged by a baby nipple enabling the device to serve as a baby bottle.

In a preferred form of the invention, Figures 1–5 show a vessel 10 used as a tumbler or container member, being provided with a flared edge or rim 11 and constituting the lower half of the fluid or other item receiving compartment of the device, the subject of the invention herein.

Vessel 10 is preferably made of an unbreakable material such as the aforementioned polyethylene or similar material to augment sealability with a closure member generally indicated by letter A as will hereinafter appear. The size and shape of vessel 10 is variable to suit aesthetic and practical requirements.

The closure member A for vessel 10 and as seen in Figures 1–5 has a three-fold function: namely as a removable, seal-tight closure for vessel or tumbler 10; secondly, as a capacity booster therefor; and thirdly as an auxiliary feed mouth and dispensing spout for the vessel when the closure member A is in seal-tight engagement therewith.

When the device is required to be used as a storage receptacle, the assembled parts are in engaged position; and when required to be used as a holder for fluids, closure member A is in engaged position with vessel 10, the spent seal removed for filling and then closed. Thereafter the said seal is removed for introduction of a drinking straw or for dispensing the fluid through the spout. Where the device is used as a beverage or other food shaker, closure member A is removed as shown in Figure 2, the ingredients added to vessel 10, the closure applied at the grooved sealing edge and finally the spout is covered by a seal. The device is then shaken as shown in Figure 3 and thereafter the spout seal is removed and the device serves as a dispenser of any type of liquid food drink such as malted milk, alcoholic drinks, cocktails and mixtures used for baking. When used to whip cream and for general beating, the closure member A only is removed for introducing ingredients leaving the seal spout intact. Thereafter member A is closed and the assembly is agitated by hand.

Closure member A, molded or formed from polyethylene or other material having similar physical characteristics, is of any desirable shape and size but as shown is round in any cross-section, and comprises a continuous side wall 12 terminating in a top wall 13, the latter having a reduced feed and spout functioning neck 14 communicating with an opening 15 in the top wall. Neck 14 is provided with a seal of any desirable type, but as shown in one form of the invention is of a type disclosed in applicant's aforementioned U. S. Patent Number 2,487,400.

The seal for the spout or neck 14 as shown in Figure 1 cooperates with a flared peripheral rim 16 and is comprised of a central wall 17, an upwardly extending grooved peripheral rim comprised of inner and outer walls 18 and 19, a top wall 20 connecting the said walls 18 and 19 and a flared portion 21 extending from outer wall 19 for removal purposes. The inner lateral dimension of the groove outer wall 19 therealong is less than the outer lateral dimension of the flared neck edge 16 therealong for purposes of insuring sealability between the groove and the said neck edge.

Continuing, spaced and integral with the lower edge of side wall 12 of closure A is an upwardly disposed and grooved peripheral rim having inner and outer walls 23 and 24, the inner wall being spaced from closure side wall 12 by a concentric well 22.

The closure member side wall 12 and top wall 13 constitute an effective central wall for the peripheral groove delineated by walls 23, 24 and 25, the said central wall being normally taut, but is depressible by lifting flange 26 engageable by the thumb and bearing pressure on top wall 13 by another finger for purposes of removing closure A from vessel 10.

It is to be noted that the lateral or diametric dimension of the inner side of outer wall 24 is less than the outer or diametric dimension therealong of the flared portion 11 of vessel 10 whereby greater sealability is established.

Closure member A is applied to the vessel 10 at the flared portion 11 by hand conformation along the axis of the grooved rim top wall 25 and is removable therefrom by a peeling off type of procedure, namely by applying the forefinger to top wall 13 and the thumb under the flared portion 26.

If tumbler or vessel 10 at least at rim 11 is also made of flexible and resilient material having a slow rate of recovery such as locally distortable polyethylene or material having similar physical characteristics, then a live resistance is offered between the groove of closure member A and the vessel rim 11.

Sealing is effected between the upper part of the inside of the outer defining wall 24 and the inside of the connecting wall 25 relative to the vessel mouth or rim 11 where the lateral dimension of the inside of the outer groove wall 24 is less than the outside diameter or lateral dimension of vessel flared portion 11 as most clearly illustrated in Figure 9, all owing to resiliency of the groove walls 23, 24 and 25.

It is obvious that the device as described may also be used in the packaging, shipment and storage of alcoholic liquids, carbonated beverages, fruits, preserves, milk and milk products, cheese, candy, other foods and beverages.

The assembly may be closed under a partial vacuum both to enhance the sealing characteristics of the removable parts and to permit building up of limited pressure within the assembled device. This is accomplished by incompletely engaging closure member A at the grooved peripheral rim of walls 23, 24 and 25 with vessel rim 11, and then depressing or squeezing vessel 10 adjacent the unengaged rim portion prior to completing engagement at the unengaged parts; or by squeezing or depressing vessel 10 or closure side wall 12 when said parts are in engagement before the spout seal is applied.

In removing closure A from vessel 10 the vacuum inside the assembly may offer a palpable resistance thereto (thereby making the seal more efficient), and it has been found that by simultaneously depressing the vessel 10 at an area adjacent flared edge 11 and raising the adjacent finger gripped section of flange 26, the vacuum is suddenly broken and the closure becomes easily removable thereafter by a peeling-off type of operation.

Figures 6–9 show a modified form of closure member of any suitable size and shape generally designated by letter B wherein the top wall 27 is provided with a mouth opening 28 having a main neck wall 29 extending therefrom, the neck wall 29 having a reduced and auxiliary spout acting neck 30 extending therefrom.

As shown in Figure 9, neck wall 29 is inwardly inclined toward the base to mount a desirable dispensing closure such as a baby-nipple 31 having a removing tab 32 extending beyond the rim of top wall 27. If wall 29 is not used to mount a functional member similar or dissimilar to nipple 31, then the spout neck 30 functions to receive any type of removable seal.

The seal shown in Figure 7 has the general construction of the spout seal shown in Figure 4 and heretofore described except that the seal is hingedly attached to an integral extension lug 33 of a ring 34, said ring and lug preferably being of the same material as the seal, namely, polyethylene or material having similar characteristics.

Flange or offset portion 21 of the spout seal of Figure 7 is provided with diametric and opposite extending disposed lugs, the forward one 35 being a removal tab and the rear lug 36 having aligned and opposite trunnion extensions 37 coextensive with an enlarged and rounded edge 38 of lug 36.

Trunnions 37 are adapted to slidably and rotatably engage with a pair of horizontally aligned and opposite cylindrical openings 39 forming the bases of a pair of oppositely disposed vertical notches 40 disposed on a pair of opposite bearing lugs 41 integral with and along the lateral edges of lug 33. Thus, the spout seal is hingedly engageable with ring 34; and the latter is frictionally and rotatably engageable with and removable from the base of spout neck wall 30 by reason of the polyethylene or similar material from which said ring is molded or formed.

The seal at lug 36 is applicable to and removable from the bearing lugs 41 by lateral movement whereby trunnions 37 and coextensive rounded and enlarged edge 38 are slidable in and out of bearing lug openings 39. It is to be remembered that the relative sliding and rotary movement between the spout seal and the ring 34 is resisted somewhat to avoid looseness in operation by the resiliency and natural coefficient of friction of the polyethylene or material having similar characteristics from which the spout seal parts and ring parts are made.

The hinge type of seal above described is not claimed herein but forms the subject matter of an independent application for patent.

In Figure 9, the inner groove wall 23a is shown as spaced from the inside of flared edge 11 of vessel 10 and a finger engaging offset 26a on the lower edge of outer groove wall 24a is provided instead of the groove walls 23 and 24 and the flange 26 as shown in Figures 1–5. This indicates that it is not necessary to have the inside of groove inner wall 23a grip the inside of flared edge 11 for seal-tight engagement.

The many purposes to which the above described assembly and parts thereof may be put are not possible of enumeration and the structure in accordance with its functions may be regarded as an all purpose device both for the home and commercially.

I wish it understood that minor changes and variations in the material, integration, location, size and shape of

I claim:

1. A household receptacle and closure for selective use as a beverage shaker, a dispenser, a beater, a canister, a package, a tumbler and the like, comprising a lower vessel having an open mouth and a mouth rim, a disengageable closure vessel having a relatively large volumetric capacity and having a complementary mouth adapted to engage the mouth of the lower vessel and to augment the capacity thereof and having a laterally offset upwardly extending peripheral groove extending from the mouth of said closure vessel, the outer wall of said groove having a smaller inner diameter than the outer diameter of the mouth rim of the lower vessel, said groove being removably engageable at the outer wall thereof with said lower vessel mouth rim for seal-tight and yieldable engagement therewith, said closure vessel having on one wall a filling and pouring spout and a removable closure therefor, at least either one of said closure and lower vessels being formed of locally deformable and resilient plastic material.

2. In a household receptacle and closure for selective use as a beverage shaker, a dispenser, a beater, a canister, a package, a tumbler and the like, a receiving vessel circular in cross-section having an open mouth and a mouth rim, a disengageable closure vessel also circular in cross-section wherein the height is substantially equal to the mouth diameter to augment the capacity of said receiving vessel and having top and side walls, said side wall terminating at the open mouth in a peripheral and upwardly extending, inverted and engageable groove for seal-tight and yieldable engagement with the mouth rim of the receiving vessel, the said groove having inner, outer and connecting walls wherein the inner diametric lateral dimension of the outer groove wall surface is smaller than the outer diametric dimension of the said mouth rim corresponding surface, at least either one of said closure and receiving vessels being formed of locally deformable and resilient plastic material.

3. A household receptacle and closure for selective use as a beverage shaker, a dispenser, a beater, a canister, a package, a tumbler and the like, comprising a receiving vessel circular in cross-section having an open mouth and a mouth rim, a disengageable closure vessel also circular in cross-section to augment the capacity of said receiving vessel and having top and side walls, said side wall terminating at the open mouth in a peripheral and upwardly extending inverted and engageable groove for seal-tight and yieldable engagement with the mouth rim of the receiving vessel, the said groove having inner, outer and connecting walls wherein the inner diametric lateral dimension of the outer groove wall surface is smaller than the outer diametric dimension of the said mouth rim corresponding surface, the said closure vessel having on the top wall thereof a communicating spout and a removable and resilient sealing cover member therefor, at least either of said closure and receiving vessels being formed of locally deformable and plastic material.

References Cited in the file of this patent

UNITED STATES PATENTS

| Number | Name | Date |
|---|---|---|
| 300,867 | Hauck | June 24, 1884 |
| 701,070 | Minwegen | May 27, 1902 |
| 925,781 | Mathy | June 22, 1909 |
| 1,706,335 | Toch | Mar. 19, 1929 |
| 2,092,772 | Nadelson | Sept. 14, 1937 |
| 2,099,055 | Ferngren | Nov. 16, 1937 |
| 2,328,084 | Lomax et al. | Aug. 31, 1943 |
| 2,487,400 | Tupper | Nov. 8, 1949 |
| 2,592,485 | Stair | Apr. 8, 1952 |
| 2,606,586 | Hill | Aug. 12, 1952 |
| 2,626,647 | Barton | Jan. 27, 1953 |
| 2,695,645 | Tupper | Nov. 30, 1954 |